US012054981B2

(12) United States Patent
Hinojosa

(10) Patent No.: US 12,054,981 B2
(45) Date of Patent: *Aug. 6, 2024

(54) PRE-ASSEMBLED GATE OPENER ASSEMBLY

(71) Applicant: Troy Hinojosa, Corpus Christi, TX (US)

(72) Inventor: Troy Hinojosa, Corpus Christi, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,666

(22) Filed: May 16, 2023

(65) Prior Publication Data

US 2023/0287738 A1 Sep. 14, 2023

Related U.S. Application Data

(60) Continuation of application No. 18/069,968, filed on Dec. 21, 2022, now Pat. No. 11,840,875, which is a division of application No. 17/204,811, filed on Mar. 17, 2021, now Pat. No. 11,649,675.

(51) Int. Cl.
*E06B 11/02* (2006.01)
*E06B 11/04* (2006.01)

(52) U.S. Cl.
CPC .......... *E06B 11/026* (2013.01); *E06B 11/045* (2013.01)

(58) Field of Classification Search
CPC .... E06B 11/026; E06B 11/045; E05F 15/643; E05F 15/635; E05F 15/00; Y10T 29/49993; Y10T 29/49963
See application file for complete search history.

(56) References Cited

U.S. PATENT DOCUMENTS

| | | | | |
|---|---|---|---|---|
| 4,665,650 A * | 5/1987 | Hall | E05F 15/614 | 74/567 |
| 4,815,713 A * | 3/1989 | Schmanski | E04H 17/08 | 248/156 |
| 5,373,664 A * | 12/1994 | Butler | E01F 9/685 | 49/358 |

(Continued)

FOREIGN PATENT DOCUMENTS

| | | | |
|---|---|---|---|
| CN | 109057690 A * | 12/2018 | E05F 15/643 |
| EP | 0094628 A2 * | 11/1983 | E05D 15/06 |
| EP | 1098059 A1 * | 5/2001 | E05D 15/0617 |

*Primary Examiner* — Justin B Rephann
(74) *Attorney, Agent, or Firm* — Miguel Villarreal, Jr.; Gunn, Lee & Cave, P.C.

(57) ABSTRACT

A pre-assembled gate opener assembly is comprised of a gate and an anchor assembly having a platform. A plurality of track assemblies on the platform provide a track on which the gate may slide from a first position (closed) to a second position (open) and any position in between. A guidepost having a "Shepherd's hook" configuration guides the gate as the gate passes therethrough. A pair of rollers within the interior of the top of the guidepost makes continuous contact with each side of the top of the gate both while the gate is stationary and in motion. A gate opener controller contains the required electrical connections to fully the operate gate opener assembly. Subterrain anchor supports provide the necessary support for the gate opener assembly. An alternative embodiment accommodates nontraditional configured gates. Installation of the gate opener assembly is performed by do-it-yourselfers in minimal time.

4 Claims, 10 Drawing Sheets

(56) References Cited

U.S. PATENT DOCUMENTS

| | | | | | |
|---|---|---|---|---|---|
| 6,092,338 | A * | 7/2000 | Crowner | E05F 15/643 | 49/360 |
| 7,191,573 | B1 * | 3/2007 | Newton, II | E04H 12/2253 | 52/170 |
| 7,988,035 | B2 * | 8/2011 | Cox | A47G 29/12095 | 232/54 |
| 8,534,005 | B2 * | 9/2013 | Thomas | E06B 11/02 | 16/236 |
| 9,406,207 | B2 * | 8/2016 | Parsadayan | E05F 15/643 | |
| 9,452,761 | B2 * | 9/2016 | Romero | E05D 15/0617 | |
| 10,697,225 | B2 * | 6/2020 | Qiu | E05F 15/643 | |
| 2008/0202032 | A1 * | 8/2008 | Loidolt | E05D 15/0669 | 49/413 |
| 2008/0226391 | A1 * | 9/2008 | Phillips | E01F 13/048 | 404/6 |
| 2009/0072549 | A1 * | 3/2009 | Garlington | E05B 65/0007 | 292/346 |
| 2009/0165201 | A1 * | 7/2009 | Vultaggio | E04H 4/142 | 33/365 |
| 2010/0024307 | A1 * | 2/2010 | Dale | E06B 11/045 | 49/404 |
| 2010/0127231 | A1 * | 5/2010 | Langenwalter | E04H 12/2215 | 256/65.01 |
| 2012/0066976 | A1 * | 3/2012 | Murray | E05F 15/643 | 49/358 |
| 2012/0198773 | A1 * | 8/2012 | Younce | E05F 15/635 | 310/83 |
| 2014/0259930 | A1 * | 9/2014 | Gilliam | E05F 15/635 | 49/70 |
| 2016/0356006 | A1 * | 12/2016 | Neusch | E01F 13/12 | |

* cited by examiner

PRE-ASSEMBLED GATE OPENER ASSEMBLY

CROSS-REFERENCES TO RELATED APPLICATIONS

This is a continuation application claiming priority to and the benefit of U.S. application Ser. No. 18/069,968, filed Dec. 12, 2022, which is a divisional application entitled, "Method of Installation of a Gate Opener Assembly," claiming priority to and the benefit of U.S. application Ser. No. 17/204,811, filed Mar. 17, 2021, entitled "Gate Opener Assembly," each of which is hereby incorporated by reference herein.

STATEMENT REGARDING FEDERALLY-SPONSORED RESEARCH OR DEVELOPMENT

Not applicable.

BACKGROUND OF THE INVENTION

1. Field of the Invention

The present invention relates to gate openers. More specifically, the invention relates to a gate opener assembly or system and method of installation.

2. Description of the Related Art

There exists in the art gate opener assemblies or platforms. These existing gate opener assemblies require underlying flat and level surfaces, such as, but not limited to, a concrete slab, caliche, asphalt, or crushed stone pad. This is important as over time, the ground will shift and move, especially during a drought. The prior art requires the use of a forklift or other heavy machinery for installation. However, if the person or company does not own their own heavy machinery, there may be substantial costs in renting out the appropriate heavy machinery necessary. The currently available gate opener assemblies then, cannot be installed with just two individuals, but requires much more equipment.

Further, if a platform is installed on ground that has not been prepped, the gate will not be level. This will adversely affect the functionality of the gate, reducing the life of the gate and, in some instances, creates a dangerous environment. In this regard, should the underlying surface of these prior art platforms become un-level, so too would the platform and gate. In addition, there would be a shifting of the center of gravity causing the platform to become unstable (not balanced) when the gate is in a fully extended or retracted (cantilevered) position. In this unsafe circumstance, it is possible that the entire structure can topple over and injure or even kill an individual. Unfortunately, stakes driven into the ground will not prevent this extremely dangerous event. The currently available gate opener assemblies simply offer no adjustment to re-balance the structure in this regard. Rather, the existing gate opener assemblies are designed to be plunked down onto a surface with prior extensive preparation, e.g., grading, leveling, and are primarily held in place by gravity.

The typical installation time for existing gate opener assemblies generally vary but often fall within about 2 weeks from start to finish.

When a gate installer goes out on jobsites, a frequent complaint by the customers is that the gates and/or fences are not functioning properly or at all. These gates and/or fences were previously installed by another fence and/or gate company. The problem one finds most often is that the installation of the gate opener assembly was performed incorrectly. This often requires expensive repair to resolve the problem of having an incorrect layout.

There are also safety concerns with existing gate opener assemblies. For example, standard slide gates have structures on both sides of the gate that are fixed. If a child were to get on the gate, and gate is activated, there is a high likelihood that the child will be get injured or sustain either a shearing injury or pinch point (i.e., getting caught between gate and platform).

Accordingly, there is a need for a gate opener assembly or platform that may be installed correctly each and every time without the assistance of a professional installer (e.g., a do-it-yourself install) and without the need to perform extensive and expensive ground preparations. There is a further need for such a device that is robust yet safe, and will remain level for the life of the assembly, thereby reducing the installation time and increasing the safety and enjoyment of the gate opener assembly. Finally, there is a need for a gate opener assembly that may be assembled and installed quickly and safely with minimal costs and labor, yet be robust enough once complete to provide years of functionality. The present invention addresses these and other shortcomings of the currently existing gate opener assemblies or systems.

For purposes of this application, the term "assembly" and "platform" are used interchangeably.

BRIEF SUMMARY OF THE INVENTION

The present invention is a gate opener platform designed for residential type gates of ornate, aesthetically pleasing and non-industrial appearance. Furthermore, the gate opener assembly of the present invention has a sleek and very small physical and visual footprint. Once delivered to a jobsite, the gate opener assembly of the present invention can be installed in two (2) hours or less, as there is no grade preparation required for the platform on which to sit (i.e., the pad site). The present invention provides a gate opener assembly that may be properly installed without the assistance of a professional installer (e.g., a do-it-yourself install).

The gate opener assembly of the present invention has a built-in anchoring system which can be anchored to "As Is" terrain, or any surface available. The platform of the present invention is adjustable in various directions, including upward, downward and laterally. Unlike the prior art, the present invention does not require underlying flat and level surface, such as, but not limited to, a concrete slab, caliche, asphalt, or crushed stone pad. This is important as over time, the ground will shift and move especially during a drought. Under no circumstances that the inventor is aware can the platform and gate of the present invention become unbalanced and topple over as a result of underlying ground erosion or shifting as a de-stabilizing factor.

Installation of the platform and gate of the present invention requires minimal experience and tools. Prior gate opener installation, gate fabrication, welding, concrete finishing, forklift and/or heavy equipment experience are not required. All components of the present invention can be lifted into place and installed by a single person in as little as 1 or 2 days.

Gate opener chassis sizes change and evolve on a regular basis. The gate opener assembly of the present invention is well suited for this variation as the present invention also is capable of being retrofitted to accommodate gate openers of any make or model, without regard to size. In other words, the present invention is nonspecific to any one gate opener bolt pattern or post mount.

The present invention offers enhanced safety features, including no vertical pinch points, sharp corners, or possibility for a shearing injury from inside of gate (where small children are more likely to be). The present invention contains a "shepherd's hook" that rises from the platform vertically and helps guide the gate as the gate traverses between a first position (closed) and a second position (open). As a result, the present invention complies with applicable standards, including UL-325 standard regulation, whereby the rollers which maintain the gate path as the gate travels are not, (nor can they be) exposed, and thus, eliminates the possibility of shearing injury. All the rollers in the system of the present invention are closed and eliminate any chance of someone being pinched and injured during gate travel between a first closed position and a second opened position.

The platform of the gate assembly of the present invention is designed, in most cases, for permanent installation. However, if desired by the user, the present invention may be removed and transferred to a different location and reinstalled in a matter of hours. For example, if the homeowner moves but wants to keep the gate assembly, the homeowner may be able to take the gate assembly for installation at the new home. The platform of the present invention is completely modular and may be taken apart for easy shipment to a desired destination via freight line anywhere in the U.S.

The gate opener assembly of the present invention comprises a "P" shaped platform, gate, gate track, gate track rollers, and guidepost and is preassembled in its entirety as a complete product prior to shipment to the end user (customer). The gate opener assembly of the present invention is then delivered to the jobsite and lifted onto in-ground concrete footings, or anchor supports, and all-thread structures (which have been installed one day prior giving the concrete time to cure).

The typical installation time for gate assemblies generally vary but often fall within about 2 weeks from start to finish. In contrast, an advantage of the present invention is the substantial reduction of installation time of a gate. The gate, gate opener, and all related hardware are installed simultaneously in approximately two hours' time instead of two weeks. With this reduction in time also comes a reduction in cost as there is less need for labor.

An additional advantage is that the gate assembly of the present invention does not require the need for professional installation as end users may do the present invention themselves. Tools the user may be required to use for installation include a level, post-hole diggers, a wheel barrow, measuring tape, concrete, a crescent wrench and a drill. The user should also possess some basic knowledge, such as, measuring skills, how to dig a post-hole, how to mix concrete, and how to use a wrench. The average intended user of the present invention would possess such tools and knowledge.

In an alternative embodiment, the present invention may include an extended "shepherd's hook" to accommodate and guide larger and taller gates.

DETAILED DESCRIPTION OF CERTAIN EMBODIMENTS

Figure 1:
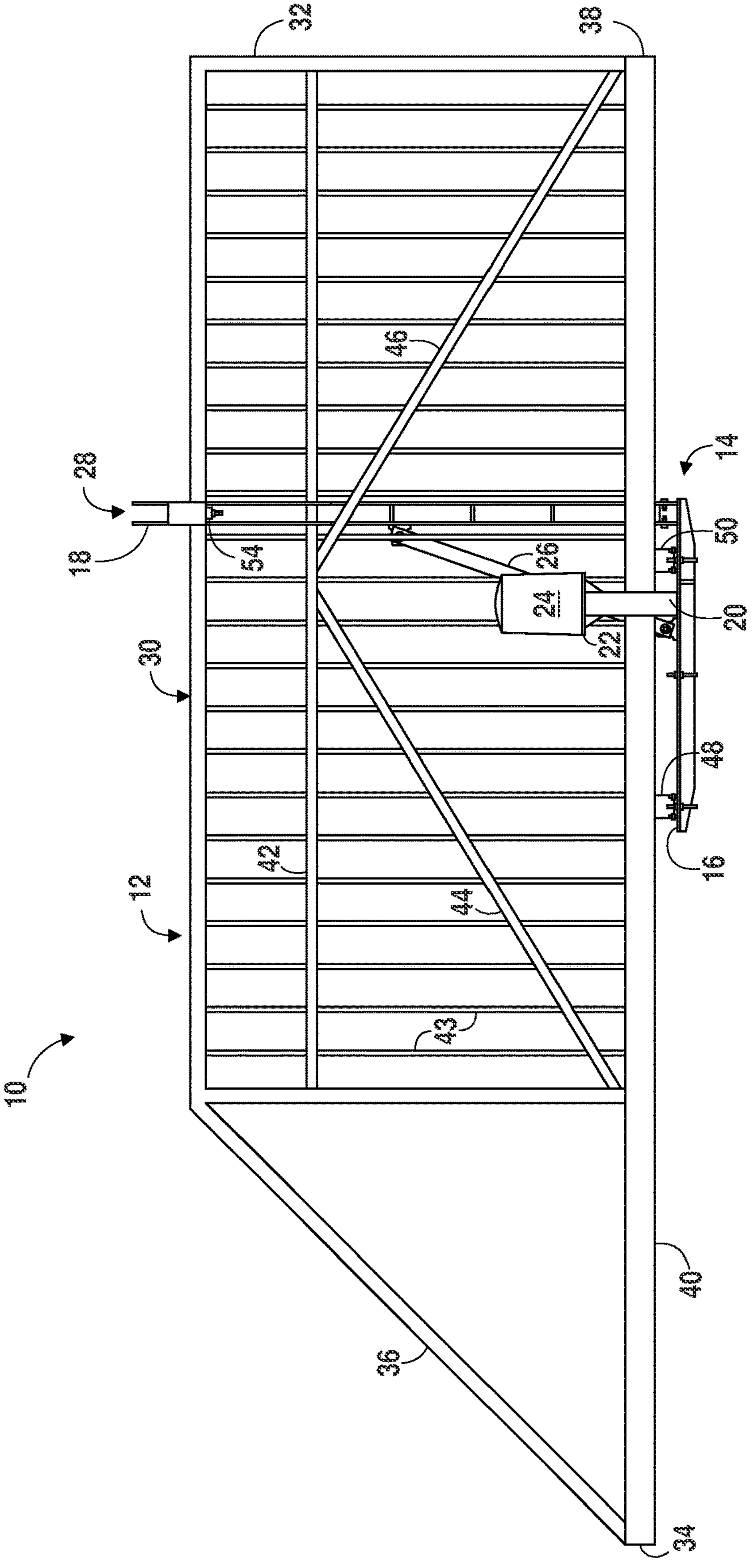
FIG. 1 is a front view of an embodiment of the present invention.
Figure 2:
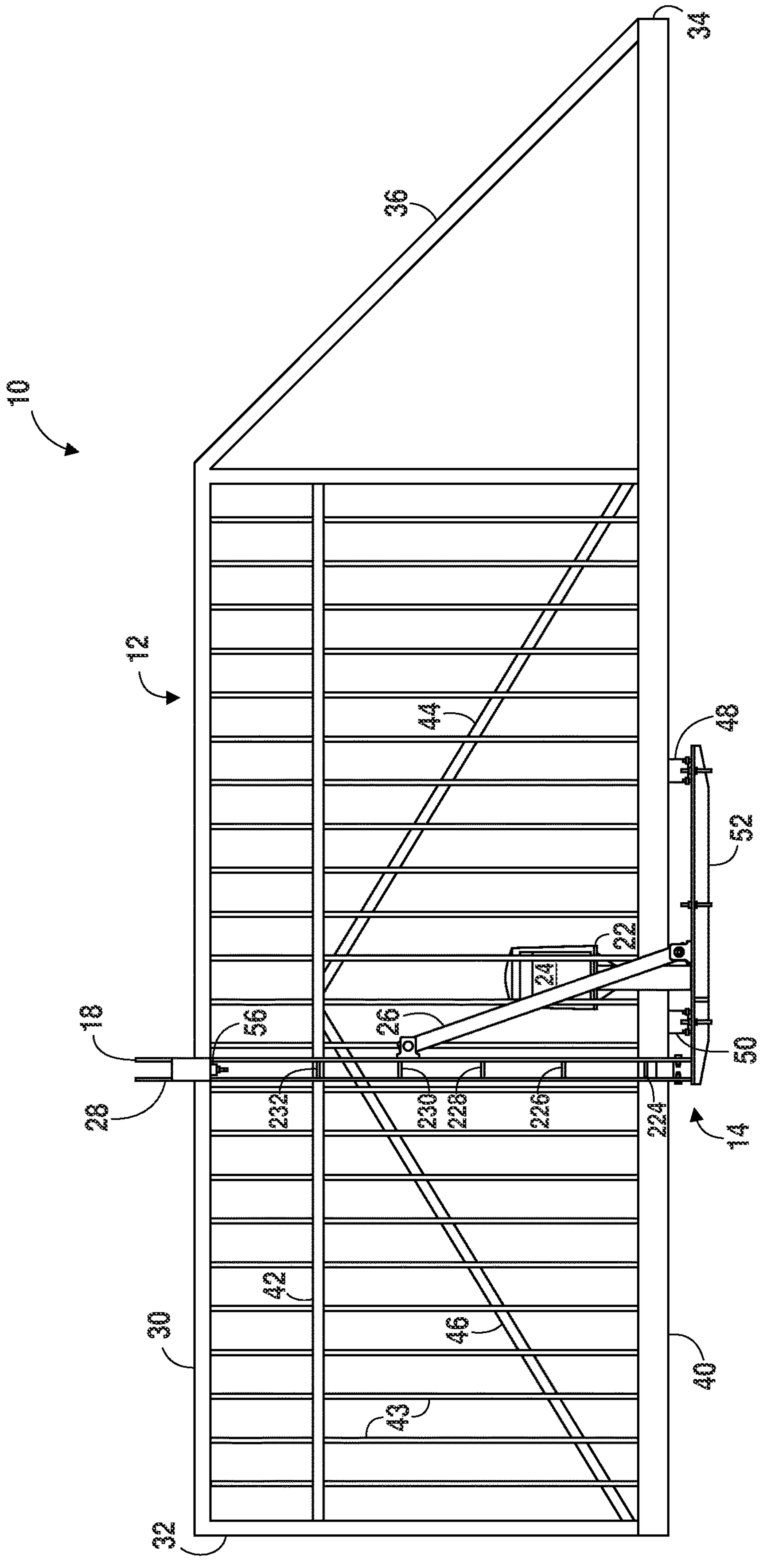
FIG. 2 is a back view with respect to FIG. 1 of an embodiment of the present invention.

Referring now to FIGS. 1 and 2, gate opener assembly 10 is comprised of gate 12 and anchor assembly 14. Gate 12 has a quadrilateral configuration, with top 30, end 32, brace 36 and bottom 40. Bottom 40 has bottom front end 34 and bottom back end 38. Brace 36 diagonally connects top 30 with bottom front end 34. Horizontal brace 42, vertical braces 43, diagonal brace 44 and diagonal brace 46 lie within the same plane as gate 12. Gate 12 is reinforced and strengthened by diagonal brace 44 and diagonal brace 46 forming a truss-like configuration between horizontal brace 42 and bottom 40.

Anchor assembly 14 is further broken down and consists of guidepost 18 attached to and extending distally from one end of platform 16 having a "P" configuration. Brace 26 attaches to mounting brackets on guidepost 18 and platform 16 and provides reinforcement to guidepost 18. Guidepost 18 is comprised of members 172 and 174—two sheets of material (which can be metal, galvanized steel, aluminum, stainless steel or other comparable robust material) that run parallel to each other (See, e.g., FIG. 8). Guidepost 18 has top curved portion 28 giving guidepost 18 a "Shepherd's hook" configuration, as shown in FIG. 1 (see, also, e.g., FIGS. 3 and 4). Guidepost 28 is strengthened via several horizontal braces 224, 226, 228, 230 and 232 spaced along the length of guidepost 28 between the two sheets of material, as shown in FIG. 2. Brace 52 traverses longitudinally along the center of P-shaped platform 16 and extends distally (downward or upward) from P-shaped platform 16, providing reinforcement and strength to P-shaped platform 16, as shown in FIG. 2.

Pedestal 20 rests on the top of P-shaped platform 16. Mounting bracket 48 extends distally from platform 16 opposite from where guidepost 18 extends. Mounting bracket 50 extend distally from platform 16 between where guidepost 18 extends and mounting bracket 48 extends, as shown in FIG. 1.

Still referring to FIG. 1, Pedestal 20 provides a platform 22 for gate opener controller 24. Gate opener controller 24 contains the required electrical connections to fully operate gate opener assembly 10. A power source (not shown) in electrical communication with gate opener controller 24 provides the necessary power for gate opener controller 24 to be operational.

Figure 4:
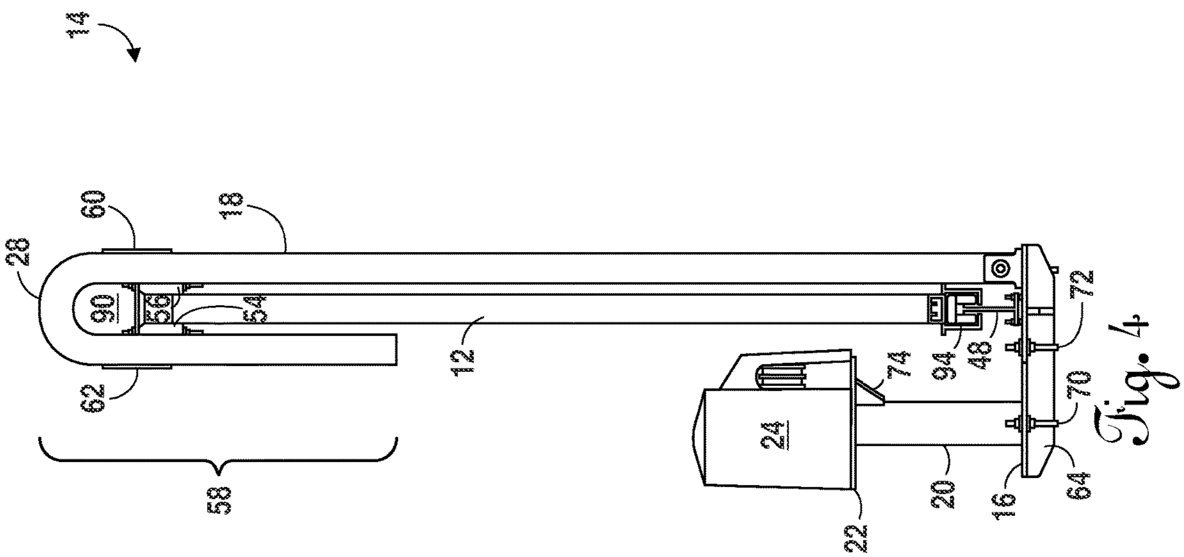
FIG. 4 is a right side view with respect to FIG. 1 an embodiment of the present invention.
Figure 3:
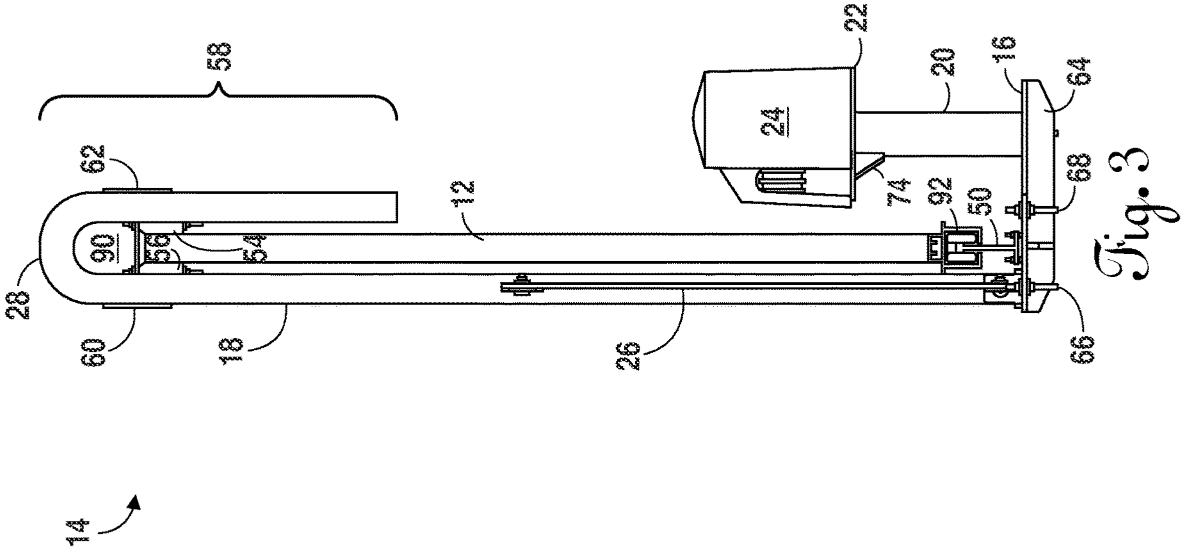
FIG. 3 is a left side view with respect to FIG. 1 an embodiment of the present invention.

Now turning to FIGS. 3 and 4, left and right side views of guidepost 18 connected with gate 12 are shown. With regard to platform 16, brace 64 traverses the width of platform 16, reinforcing and strengthening P-shaped platform 16. Fasteners 66, 68, 70 and 72 fasten and secure gate opener assembly 10, and more particularly, platform 16 to anchor supports (not shown). Brace 74 provides reinforcement and strengthens platform 22.

Turning to the gate and guidepost, gate 12 is positioned such that gate 12 passes within overlap 58 of top curved portion 28 of guidepost 18. A pair of rollers 54 and 56 is attached within the interior of top curved portion 28 of guidepost 18 and makes continuous contact with each side of top 30 of gate 12 (FIGS. 3 and 4), both when gate 12 is stationary and in motion as when gate 12 passes there through. Opening 90 provides clearance between top 30 of gate 12 and top curved portion 28 of guidepost 18. Rollers 92 attached at end of mounting bracket 50 are positioned within bottom front end 34 of gate 12, as shown in FIG. 3. Rollers 94 attached at end of mounting bracket 48 are positioned within bottom back end 38, as shown in FIG. 4. Reinforcement plates 60 and 62 strengthen top curved portion 28 of guidepost 18, as shown in FIGS. 3 and 4.

Figure 5:
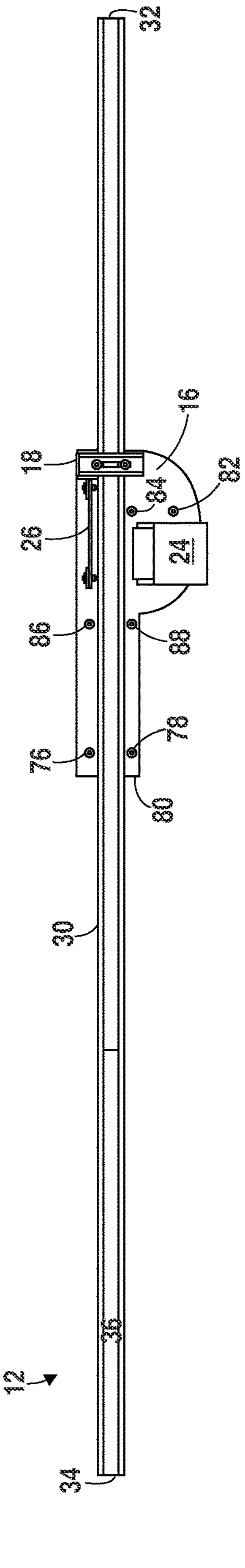
FIG. 5 is a top view of an embodiment of the present invention noting the "P" shaped platform.

Turning now to FIG. 5, the "P" configuration of platform 16 is shown. Fasteners 76 and 78 are shown near end 80 of platform 16. Fasteners 82, 84, 86 and 88 along platform 16 provide additional points of attachment to anchor supports (not shown). While the present invention uses bolts and hex nuts as the fasteners, it is understood that other comparable fasteners may also be used and still be within the contemplation of the present invention.

Referring still to FIG. 5, gate 12 is shown configured with anchor assembly 14 as viewed from the top of gate 12. Gate 12 is within guidepost 18 and traverses over the narrow portion of "P" shaped platform 16. Gate opener controller 24 is secured to the wider portion of "P" shaped platform 16.

Figure 6:
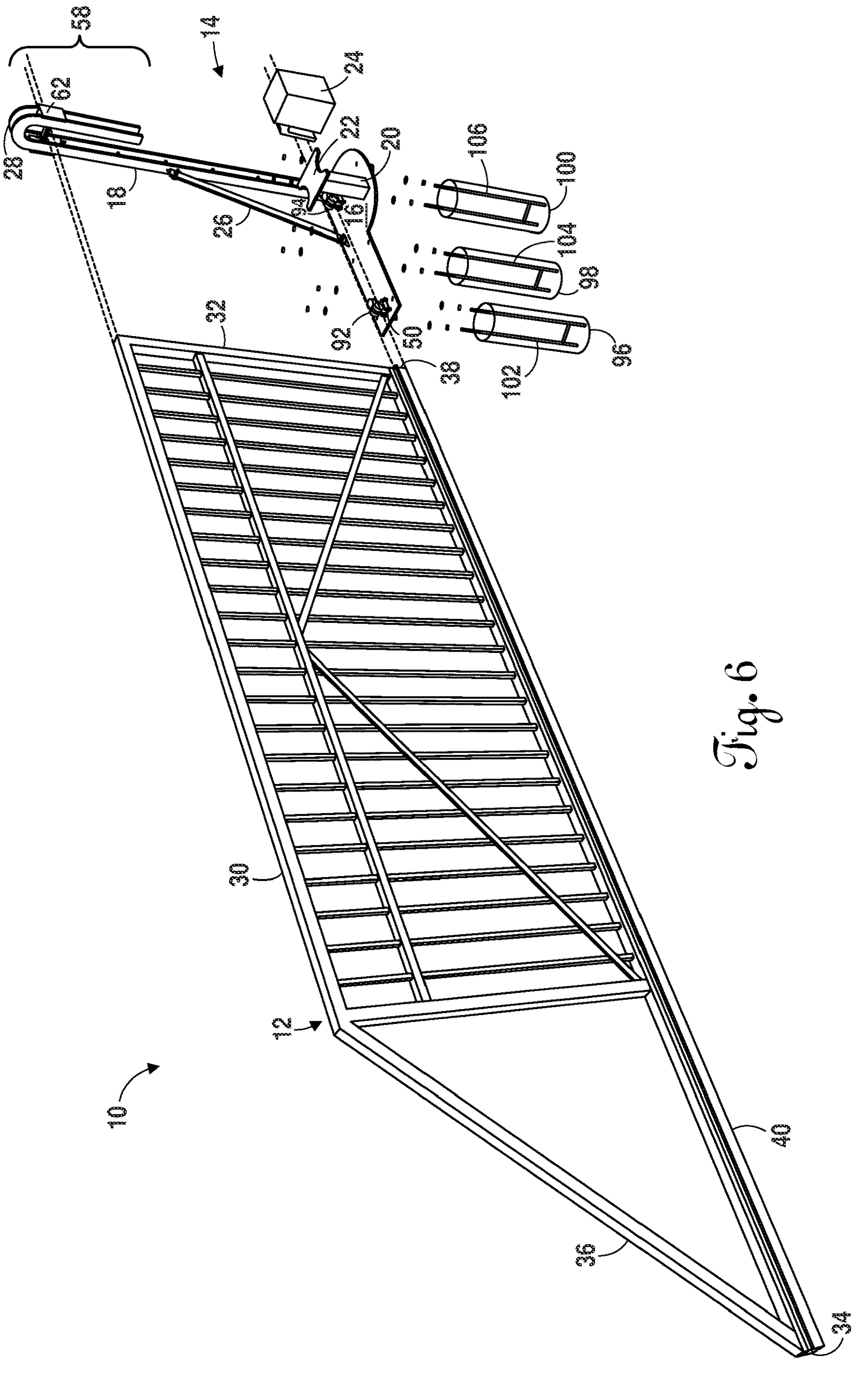
FIG. 6 is an exploded left frontal perspective view of an embodiment of the present invention.

Turning now to FIG. 6, gate 12 and anchor assembly 14 are shown. Bottom end 40 is hollow, as shown in bottom front end 34 (hollowness in bottom back end 38 may be seen in FIG. 4). Bottom end 40 is configured to accept rollers 92 and 94 therein (a track). Rollers 92 and 94 are attached to platform 16.

Top 30 of gate 12 is aligned along axis lines 41 to slide within overlapping portion 58 of top curved portion 28 of guidepost 18, as shown by broken lines in FIG. 6. Rollers 54 and 56 on either side of gate 12 stabilize gate 12 as gate 12 moves from a first position (closed) to a second position (open) and any position therebetween. Bottom back end 38 of bottom 40 of gate 12 is aligned such that rollers 92 and 94 slide within bottom 40. The configuration of bottom 40 prevents rollers 92 and 94 from coming out of bottom 40 while gate 12 is in motion. The cantilever configuration of the track, as demonstrated by mounting brackets 48 and 50 and rollers 92 and 94 together with support from top curved portion 28 and rollers 54 and 56 therewithin support the weight of gate 12 when gate 12 is in a second position (open).

Figure 7:
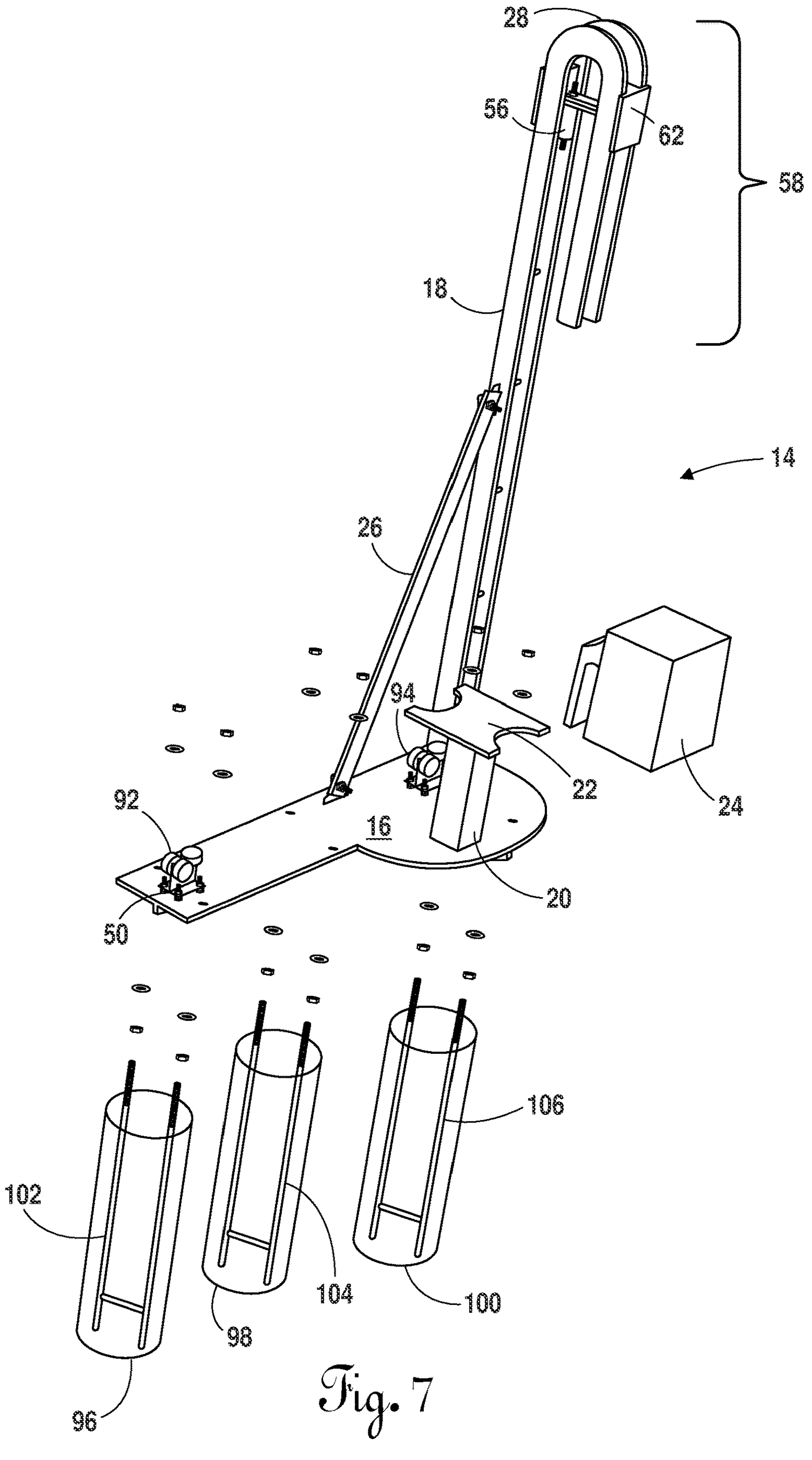
FIG. 7 depicts an exploded view of the anchor assembly of an embodiment of the present invention.

Referring to FIGS. 6 and 7, anchor supports 96, 98 and 100 are comprised of 102, 104 and 106 reinforcements (e.g., rebar) cast in cementitious material to stabilize and reinforce anchor assembly 14 and gate opener assembly 10 during use. 102, 104 and 106 reinforcements are threaded and have a portion thereof extending beyond anchor supports 96, 98 and 100. Apertures within anchor assembly 14 are aligned with and traversed by the ends of threaded reinforcements 102, 104 and 106 of anchor supports 102, 104 and 106. The ends of threaded reinforcements 102, 104 and 106 are then secured to platform 16 with washers (e.g., lock washers) and hex nuts on both the top side of platform 16 and the bottom side of platform 16, as shown in FIG. 7. Anchor supports 96, 98 and 100 are evenly spaced along platform 16 providing uniformed attachment for platform 16. The anchor supports of the present invention are placed underground and use concrete. However, other cementitious material, such as mortar, may also be used and still be within the contemplation of the present invention.

Figure 8:
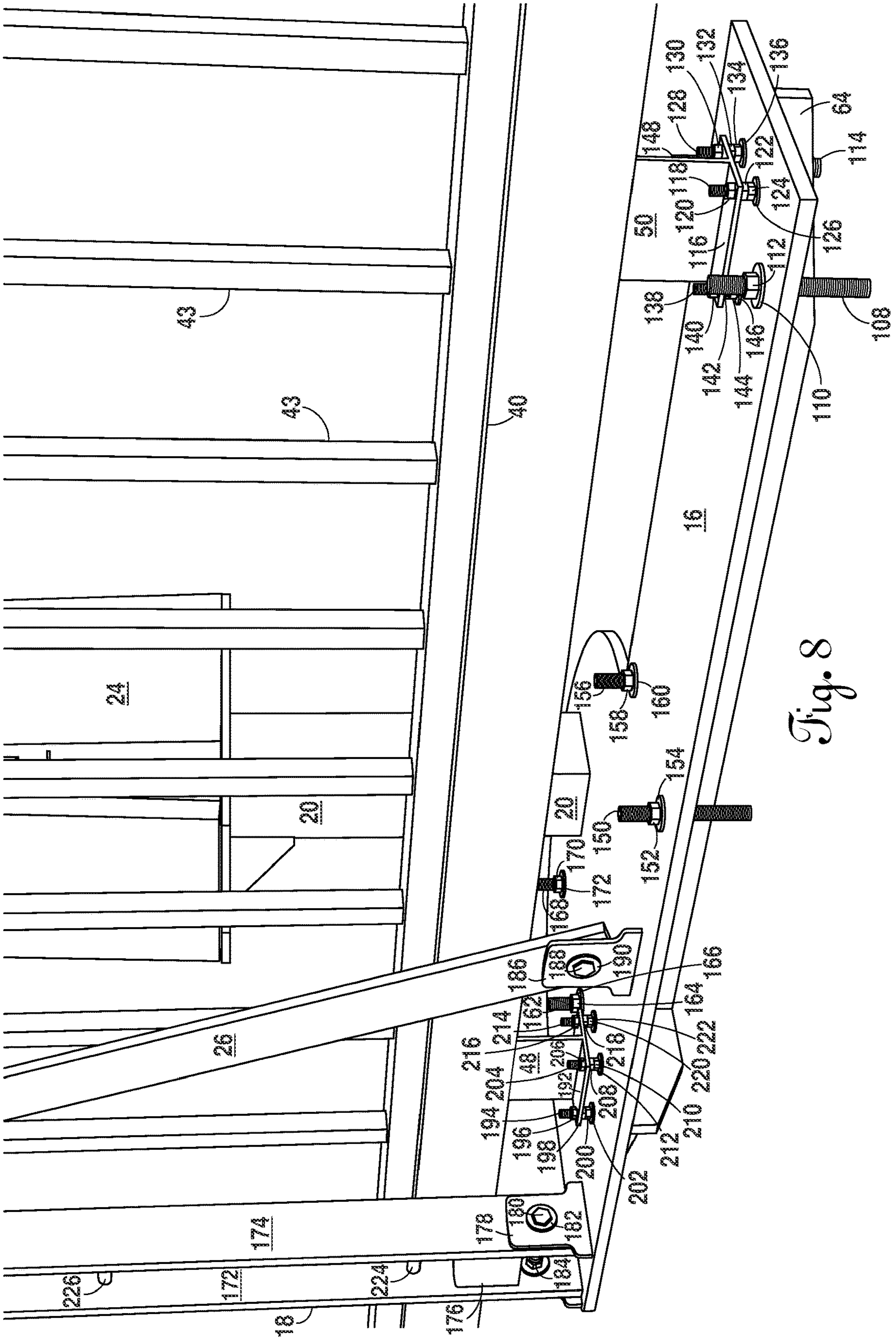
FIG. 8 depicts a close up back perspective view of the "P" shaped platform of an embodiment of the present invention.

Referring now to FIG. 8, the connections between guidepost 18 and platform 16 and platform 16 are shown. Member 172 of guidepost 18 is attached to platform 16 via a fastener of which only a washer and nut 184 can be seen. Member 174 of guidepost 18 is attached to platform 16 via mounting bracket 178 secured via a fastener, of which only bolt 180 and washer 182 are shown. It is understood that a nut similar to nut 184 of member 172 secures bolt 180 of member 174 in place. Similarly, it is understood that a bolt and washer similar to bolt 180 and washer 182 of member 174 secures washer and nut 184 in member 172. Further, a bracket, a small portion of which can be seen in FIG. 8, similar to mounting bracket 178 of member 174 is secured to member 172.

Still referring to FIG. 8, flat bottom portion 192 of mounting bracket 48 is secured to platform 16 via four fasteners, only three of which are shown. A first fastener comprises bolt 194, nut 196, nut 200 and washer 202. A second fastener comprises bolt 204, nut 206, nut 208, nut 210 and washer 210. A third fastener comprises bolt 214, nut 216, nut 218, nut 220 and washer 222. Flat bottom portion 192 is secured between nuts 196 and 198, nuts 206 and 208, and nuts 216 and 218.

Still referring to FIG. 8, brace 26 is secured to platform 16 via mounting bracket 186 using bolt 188 and washer 190. It is understood a washer and nut (not shown) is on the opposite side of brace 26 securing bolt 188 and washer 190.

Still referring to FIG. 8, flat bottom portion 116 of mounting bracket 50 is secured to platform 16 via four fasteners, only three of which are shown. A first fastener comprises bolt 138, nut 140, nut 142, nut 144 and washer 146. A second fastener comprises bolt 118, nut 120, nut 122, nut 124 and washer 126. A third fastener comprises bolt 128, nut 130, nut 134, nut 136 and washer 136. Flat bottom portion 116 is secured between nuts 140 and 144, nuts 120 and 122, and nuts 130 and 132. The present invention uses flat washers. However, other types of washers, for example, lock washer or spring washer, may be used and still remain within the contemplation of the present invention.

Figure 9:
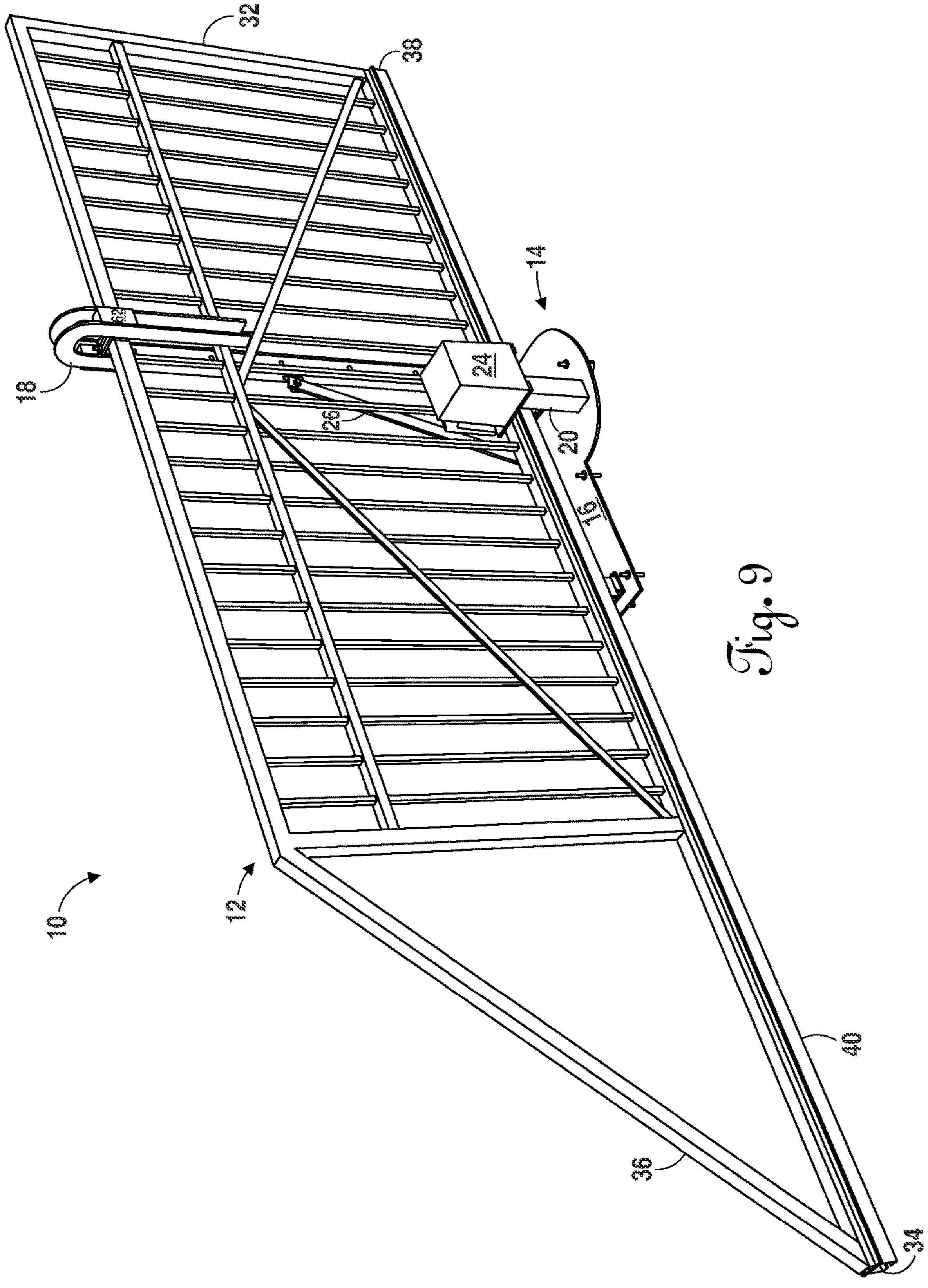
FIG. 9 is a left frontal perspective of an embodiment of the present invention.

Still referring to FIG. 8, threaded ends of 102, 104 and 106 reinforcement members are secured to platform 16 via a plurality of fasteners (bolts 162, 168, 150, 156, 146, 114, nuts 164, 170, 152, 158, 112 and washer 166, 171, 110). Gate 12 slides along rollers within bottom 40 of gate and within rollers 54 and 56 within top curved portion 28 from a first position to a second position, as shown in FIG. 9. The present invention uses six anchor points for the platform. However, it is understood that less or more anchor points may be used and still remain within the contemplation of the present invention.

Figure 10:
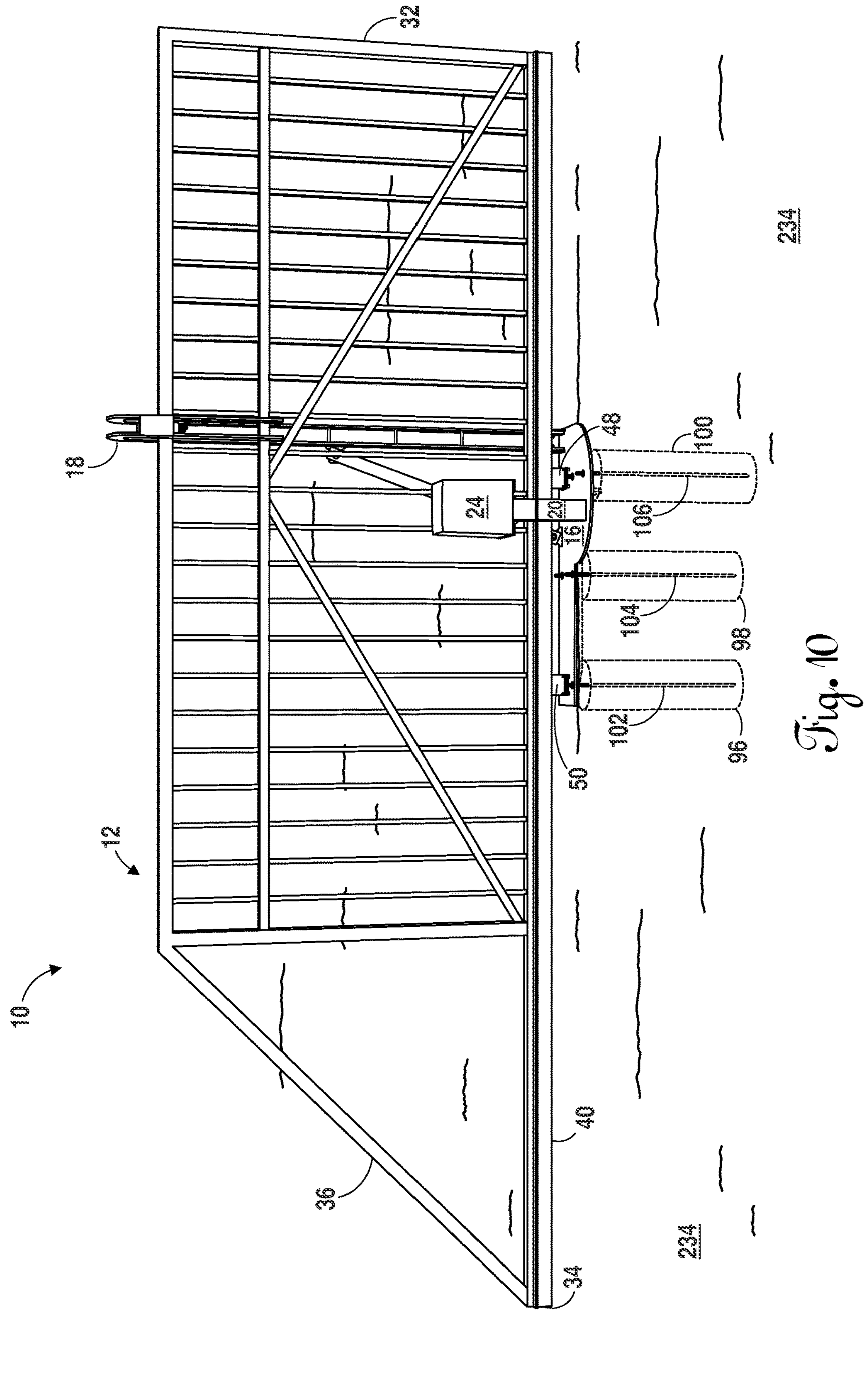
FIG. 10 is a front plan environmental view of embodiment of the present invention.

The method of installation of the present invention is now discussed. Referring now to FIG. 10, the user selects the desired ground location of where the gate opener assembly will be installed on terrain 234. Once the location of the gate opener assembly is chosen, and referring now to FIG. 10, a plurality of post holes is dug in the ground in a series pattern. Additional post holes may also be used for extra stability. Anchor supports 96, 98 and 100 are then placed in terrain 234 underground. The setting of the anchor supports may be performed at least 24 hours prior to the installation to allow for the cementitious material to harden and cure. The actual cure time depends on the type of cementitious material used and may vary from a few hours to several days. One anchor support is inserted per post hole, in series, as shown in FIG. 10.

While the present invention discusses having three post holes, the present invention may also be sufficiently anchored and secured with two post holes or additional post holes may be used, if the size of the platform is increased, and still be within the contemplation of the present invention.

Once the desired number of post holes is dug out within terrain 234 and corresponding anchor supports embedded therein using concrete or other similar cementitious substance, a portion of threaded reinforcements 102, 104 and 106 extends about six inches (6") beyond the end of the anchor supports 96, 98 and 106. The portion of threaded reinforcements 102, 104 and 106 that extends beyond the end of the anchor supports 96, 98 and 106 is threaded. A nut and washer are placed on the portion of threaded reinforcements 102, 104 and 106 extending beyond the end of anchor supports 96, 98 and 106. This portion of threaded reinforcements 102, 104 and 106 then traverses platform 16 and a second nut and washer are placed on the portion of the reinforcement member that now traverses platform 16. The nuts and washers in this configuration (one set on above, the other below "P" configured platform 16) effectively sandwiches "P" configured platform 16. In this configuration, the user may quickly adjust each of the four (4) corners to level platform 16, as desired. The track assemblies discussed below—which utilize fasteners comprising nuts, bolts and washers—may similarly be adjusted as desired to correct for any leveling that needs to be made.

The present invention uses two gate track assemblies attached to platform 16 for facilitating the movement of gate 12 from a first position to a second position. The track assemblies attached to platform 16 each comprise three rollers—two rollers parallel to each other and a third roller perpendicular to the two parallel rollers—attached to a mounting bracket having a flat bottom portion. For example, and referring back to FIG. 7, a first track assembly may include rollers 92 attached to mounting bracket 50. Flat bottom portion 116 of mounting bracket 50 is secured to platform 16 via four fasteners which allow for adjustments (e.g., to level gate) at four independent points (See, e.g., FIG. 8). Similarly, a second track assembly may include rollers 94 attached to mounting bracket 48. Flat bottom portion 192 of mounting bracket 48 is secured to platform 16 via four fasteners (See, e.g., FIG. 8). The track rollers may be made of metal, or, alternatively, of another robust material, such as fiberglass or hardened rubber making for a quieter gate when opening or closing. Additionally, while the present invention uses two track assemblies, additional track assemblies may be used and still be within the contemplation of the present invention.

Referring back now to FIG. 6, bottom end 40 ("gate track") of gate 12 slides and rolls over gate track rollers 92, 94 on platform 16 as gate 12 goes from a first position (closed) to a second position (opened). Gate 12 travels along axis line 41 such that top 30 of gate 12 aligns within the partial enclosure 90 of top curved portion 28 of guidepost 18. The track and roller system of the present invention uses a cantilever track.

Once gate 12, gate opener assembly 10 and anchor assembly 14 have been installed, final adjustments may be made to ensure gate 12 is level and not extending up or drooping down. To do this, the track assemblies mounted to platform 16 may be raised and/or lowered to obtain the degree of levelness desired. This can be accomplished by either raising or lowering the front roller truck assembly, and/or raising or lowering the rear roller truck assembly so that the gate is level.

Figure 11:
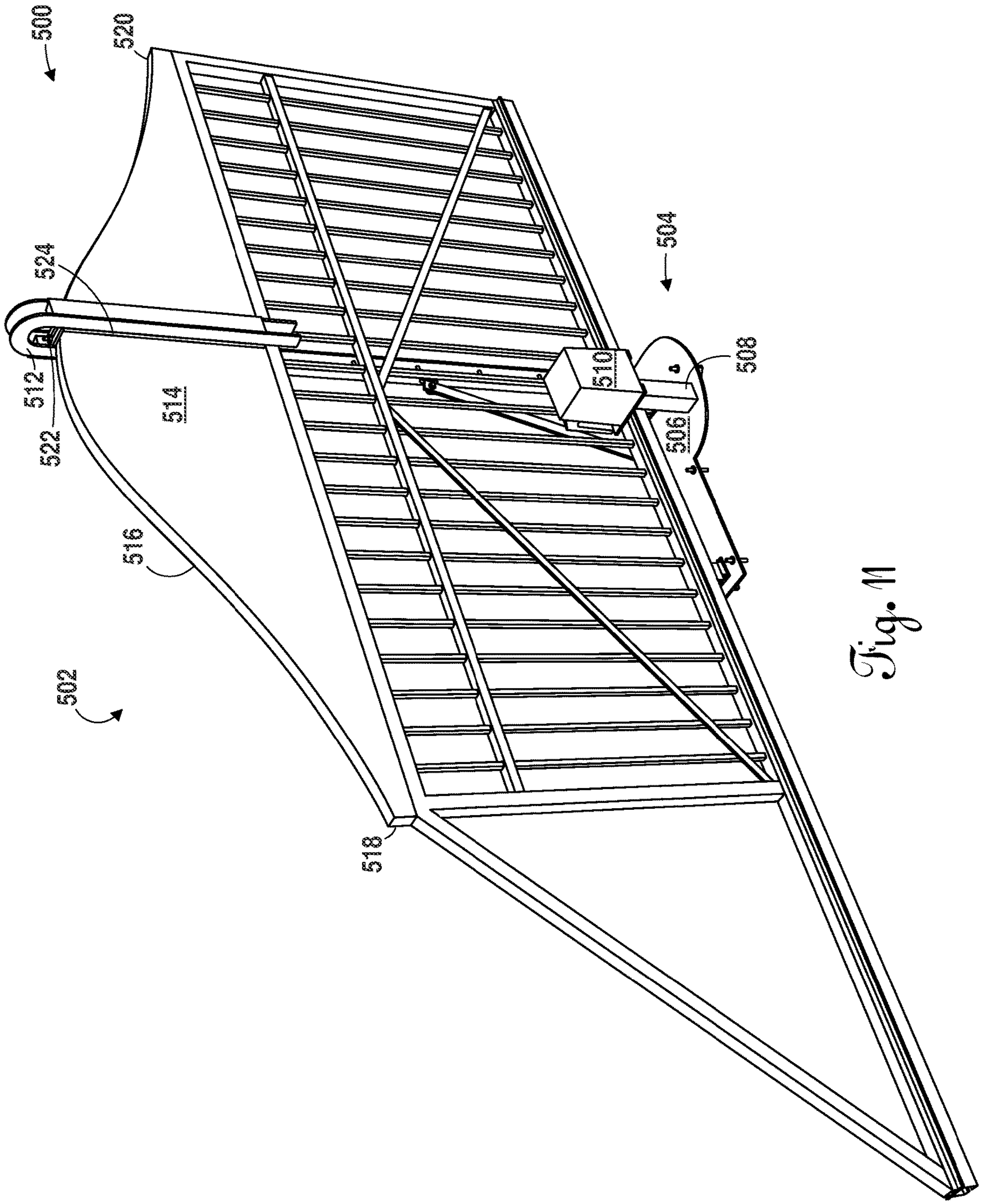
FIG. 11 is a left frontal perspective of an alternative embodiment of the present invention.

In an alternative embodiment, and referring now to FIG. 11, gate opener assembly 500 is shown. Gate opener assembly 500 is comprised of gate 502 and anchor assembly 504. Anchor assembly 504 is further comprised of anchor platform 506 having pedestal 508 extending distally therefrom and terminating at a gate opener platform (not shown) on which gate opener controller 510 rests. Guidance post 512 is attached at one end to anchor platform 506. Gate 502 traverses across anchor platform 506 along tracks formed by the hollow bottom of gate 502 and the rollers slidably there within, similar to discussions above.

Extended decorative portion 514 may be attached to the top of gate 502 extending the height of gate 502. To compensate for the additional height of gate 502 as extended via extended decorative portion 514, guidance post 512 extends distally from anchor platform 506 at a length sufficient to pass over the highest point of gate 502. Further, roller 522 and roller 524 located within the curved portion of guidance post 512 (the shepherd's hook), has a length such that at all points of traverse by gate 502 there between, rollers 522 and 524 remain in constant contact with extended decorative portion 514, providing additional stability and reinforcement. This feature of the present invention accommodates gates of varying heights. To compensate for an additional width of gate 502, guidance post 512 is widened such that elongated rollers 522 and 524 may accommodate the additional width and still allow the passing through of gate 502.

The present invention has application in the gate and fence industry, providing gates and fences to ranchers and farmers for residential and/or commercial use.

The various embodiments described herein may be used singularly or in conjunction with other similar devices. The present disclosure includes preferred or illustrative embodiments of specifically described apparatuses, assemblies, and systems. Alternative embodiments of such apparatuses, assemblies, and systems can be used in carrying out the invention as described herein. Other aspects and advantages of the present invention may be obtained from a study of this disclosure and the drawings.

I claim:

1. A gate opener assembly comprising:

a gate, wherein said gate comprises:

- a frame having a top end, a bottom end, a first end and a second end, wherein said bottom end is even with said second end and having an extended portion past said first end;
- a brace connected to said top end and said extended portion of said bottom end, said brace, said extended portion of said bottom end and said first end defining a triangular area;
- a plurality of vertical braces within a same plane of said gate;
- at least one horizontal brace extending between said first end and said second end; and
- a plurality of diagonal braces connecting said bottom end with said at least one horizontal brace in a truss configuration within said same plane of said gate; and an anchor assembly slidably connected to said gate, wherein said anchor assembly comprises:

a first platform;

a pedestal attached to said first platform;

a second platform connected to said pedestal;

a controller removably anchored to said second platform;

a guidepost attached to and extending distally from said first platform, wherein an end of said guidepost opposite said pedestal has a "U" configuration;

a plurality of guiding rollers within said "U" configuration of said guidepost;

a brace removably attached to and extending between said guidepost and said first platform;

a plurality of gate track assemblies attached to said first platform; and a plurality of anchor supports attached to said first platform for securing said anchor assembly, wherein said gate opener assembly is pre-assembled prior to shipment to an end user for installation.

2. The gate opener assembly, as recited in claim 1, wherein said plurality of gate track assemblies is configured to fit within and slide through a track in the bottom of a gate frame.

3. The gate opener assembly, as recited in claim 2, wherein each of said plurality of gate track assemblies further comprises a plurality of rollers attached to a mounting bracket secured to said platform, said mounting bracket capable of adjustments at four independent points.

4. The gate opener assembly, as recited in claim 3, wherein said plurality of anchor supports are subterranean.

* * * * *